United States Patent [19]

Kangas

[11] Patent Number: 4,569,579

[45] Date of Patent: Feb. 11, 1986

[54] DUAL-POSITIONAL CAMERA MOUNTING APPARATUS

[76] Inventor: John R. Kangas, 4813 Fir dell Dr., SE., Salem, Oreg. 97302

[21] Appl. No.: 565,918

[22] Filed: Dec. 27, 1983

[51] Int. Cl.$^4$ ............................................. G03B 17/56
[52] U.S. Cl. .................................................... 354/293
[58] Field of Search ..................... 354/293, 294, 81, 82

[56] References Cited

U.S. PATENT DOCUMENTS 2,326,657  8/1943  Johnston ............................... 354/81
3,185,057  5/1965  Hearon et al. ...................... 354/96 X
3,833,196  9/1974  Protzman ........................... 354/293 X

FOREIGN PATENT DOCUMENTS 55-93137  7/1980  Japan .................................... 354/293

OTHER PUBLICATIONS

Holzman, C. et al., *Photographic Gadgets*, H. P. Books, Tucson, AZ, 1980, p. 27.

*Primary Examiner*—John Gonzales
*Attorney, Agent, or Firm*—Chernoff, Vilhauer, McClung, Birdwell & Stenzel

[57] ABSTRACT

An apparatus for mounting a camera to a supporting structure, such as an automobile window, and permitting instantaneous reorientation of the camera's photographic frame between horizontal and vertical formats. A camera is attached to a mounting arm which is pivotally interposed between two frame members. The frame members are fixed in parallel spaced relation by a spacer therebetween, the spacer also serving to limit rotation of the mounting arm to a 90-degree arc. The camera is attached to the mounting arm in such a location with respect to the pivot point of the mounting arm so as to impart a movement to the mounting arm which urges the mounting arm against the spacer at either extremity of the arc. The frame members and the spacer define two recessed channels to closely receive the mounting arm at either extremity of the arc and stabilize the mounting arm and camera. The frame members and spacer also define a third recessed channel at the bottom of the apparatus suitable to receive the upper edge of an automobile window. Clamping screws threaded through one of the frame members clamp the apparatus securely to the automobile window. The apparatus is provided with a spirit level to ensure proper photographic attitude.

14 Claims, 3 Drawing Figures

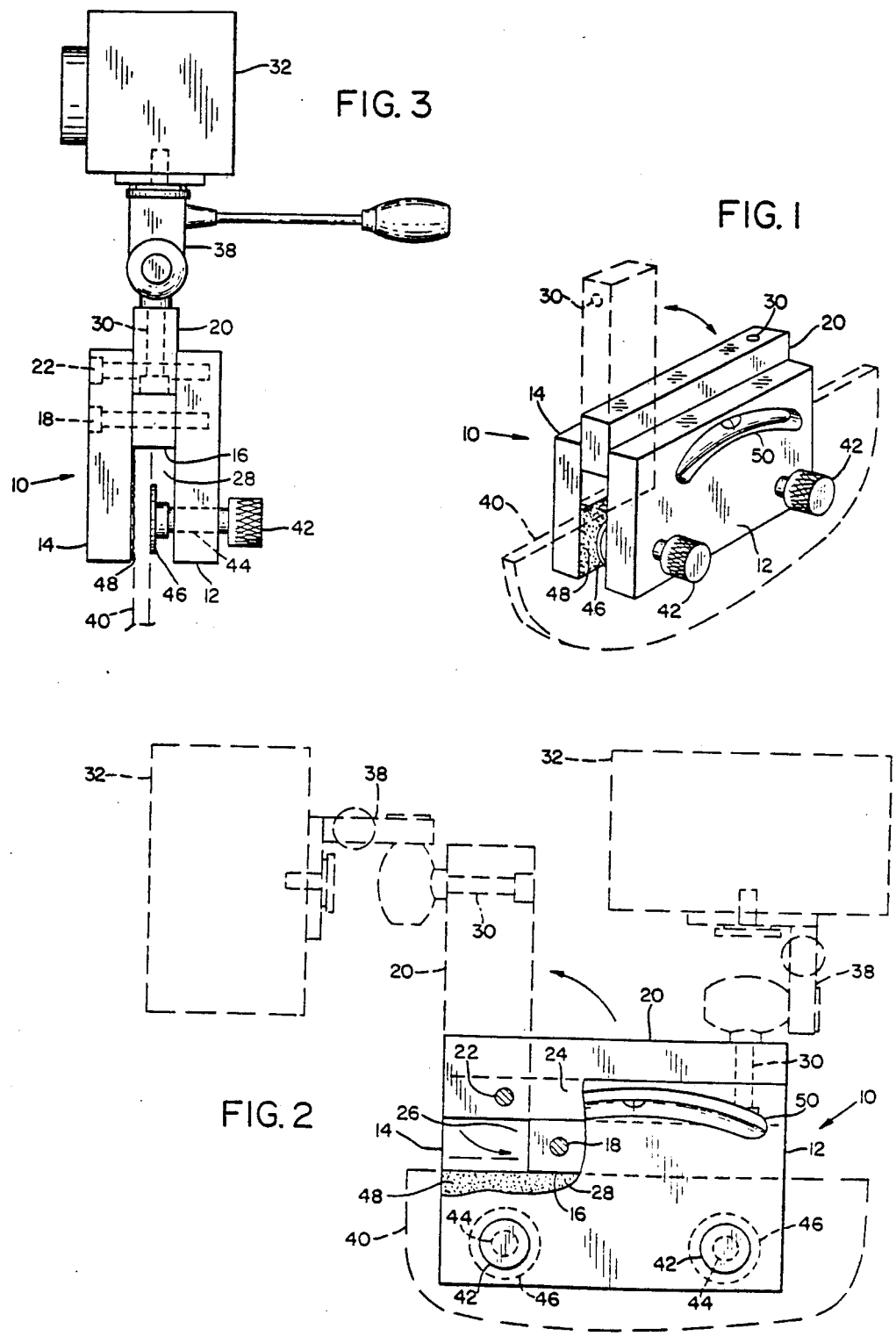

DUAL-POSITIONAL CAMERA MOUNTING APPARATUS

BACKGROUND OF THE INVENTION

This invention relates to a camera mounting apparatus for mounting a camera to a supporting structure such as an automobile window, and more particularly to such an apparatus which permits instantaneous reorientation of the camera's positional attitude between horizontal and vertical formats.

Most photographic film is segmented into rectangular frames typically having one side of the frame longer than the adjacent sides. The photographer chooses whether to orient the photographic frame vertically, with the long side of the frame vertical, or horizontally based upon a variety of factors. The frame orientation is typically accomplished by physically manipulating the camera into the desired frame orientation. Many photographic opportunities encountered in wildlife photography or at sporting events require that the photographic frame be rapidly and surely reoriented ninety degrees (90°) while simultaneously focusing, aiming, or performing other photographic adjustments. With a hand-held camera such rapid reorientation of the photographic frame is easily accomplished by rotation of the camera 90° about its focal axis, but when the camera is securely mounted upon a supporting structure, reorientation of the photographic frame may present more difficulty. The present invention provides a solution to such a problem.

Many other practitioners in this art have approached this problem. Jones, U.S. Pat. No. 3,575,098, Yeates, U.S. Pat. No. 4,016,583, Minnis, U.S. Pat. No. 2,703,691, Sloop, U.S. Pat. No. 4,198,150, Korling, U.S. Pat. No. 4,341,452, and Eckler, U.S. Pat. No. 2,110,292, all disclose an apparatus capable of reorienting the photographic frame of a camera 90° to convert from a horizontal to a vertical format or conversely. The devices of Minnis and Jones have the significant disadvantage of including some type of clamping means which must be released and re-engaged when changing the positional attitude of the camera. Yeates has an even greater disadvantage in that it is necessary for the photographer to physically hold the camera in the desired position. All of the other references cited above, Sloop, Korling and Eckler, employ a frictional pivot bearing which allows reorientation of the camera yet holds the camera in the desired positional attitude.

The present invention provides a camera mounting apparatus capable of instantaneous 90° reorientation of the camera's photographic frame without the inconvenience inherent in a clamping arrangement and without employing a frictional pivot bearing.

SUMMARY OF THE INVENTION

An arm for supportably mounting a camera is pivotably attached to a support frame having two plate-like frame members arranged in parallel spaced relation so that a portion of the mounting arm is rotatably interposed between the frame members. The frame members are held in parallel relation to one another by a spacer interconnected therebetween, the spacer not extending the full length or width of the frame members so that the frame assembly consisting of the spacer and frame members define at least three recessed channels between the frame members. The spacer also serves as a stop to limit the rotation of the mounting arm between the frame members to a 90° arc, the arm being closely received in one channel at one end of the arc and closely received in another channel perpendicular thereto at the other end of the arc.

The mounting arm includes a threaded bore for mounting a pan-and-tilt tripod head and camera on the mounting arm, the threaded bore positioning the tripod head and camera with respect to the pivot point of the mounting arm so as to urge the mounting arm to rotate into contact with the spacer when the mounting arm is positioned generally horizontally or vertically. The mounting arm, spacer and frame members are proportioned and constructed so that the mounting arm may freely rotate between the frame members but be restricted to arcuate movement about the pivot point by the closely fitting frame members on either side of the mounting arm.

The third recessed channel is located at the bottom of the apparatus below the spacer and is adapted to receive and be clamped to the edge of an automobile window by two clamping screws which are threaded through one of the frame members so as to grip the window between the clamping screws and the opposing frame member. Each clamping screw is equipped with a cushioned non-rotating friction washer so that they may be tightened against the glass window without scratching it. Similarly, the inner surface of the opposing frame member is covered with a cushioning material. Rotation of the clamping screws will cause them to selectively move toward or away from the opposing frame member to respectively clamp or release the window between the frame member and clamping screws.

Accordingly, it is a principal objective of the present invention to provide a dual positional camera mounting apparatus capable of reorienting the positional attitude of the camera from horizontal to vertical format or conversely.

It is a further object of the present invention to provide such an apparatus which does not employ a clamping arrangement or a frictional pivot bearing to maintain the camera in the desired position.

It is a further object of the present invention to provide such an apparatus which incorporates means for stabilizing the camera in both horizontal and vertical orientations.

It is a further object of the present invention to provide such an apparatus which is capable of securely mounting on an automobile window.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a perspective view of the preferred embodiment of the invention showing the alternative position of the mounting arm in dashed lines.

FIG. 2 is a partially cut-away side elevational view of the preferred embodiment of the invention showing the alternative position of the mounting arm, camera and tripod head in dashed lines.

FIG. 3 is an end elevational view of the preferred embodiment of the invention having a camera and tripod head mounted thereon.

DETAILED DESCRIPTION OF THE INVENTION

Referring to the preferred embodiment illustrated in FIGS. 1, 2 and 3, a support frame assembly 10 includes a front plate member 12, a rear plate member 14, and an intermediate spacer 16, not extending the full length or width of the plate members, which positions the front and rear plate members in parallel spaced relation to each other. The support frame assembly is rigidly held together by any suitable means such as machine screws 18. Of course, the support frame assembly could be cast, molded, or machined from a single piece of material. The support frame assembly defines three recessed channels between the plate members 12 and 14, a horizontal top channel 24 above the spacer 16 and extending the length of the plate members, a vertical side channel 26, adjacent to and partially coincident with the top channel and extending the height of the plate members, and a horizontal bottom channel 28 below the spacer adjacent and partially coincident with the side channel and also extending the length of the plate members. As as shown in FIG. 2, the uppermost portion of the side channel is coincident with a portion of the upper channel and the lowermost portion of the side channel is coincident with a portion of the bottom channel.

A mounting arm 20 is journaled for rotation between the front and rear plate members by a pin 22, or other suitable means, which extends between the plate members where the top and side channels coincide and through the mounting arm proximate one end thereof. The pin and spacer of the preferred embodiment are arranged so that the spacer serves as a stop to prevent counterclockwise rotation of the mounting arm past a vertical position and clockwise rotation of the mounting arm past a horizontal position.

In the preferred embodiment, the pivot pin 22 is equadistant from the planes defined by the floor of the horizontal top channel 24 and the floor of the vertical side channel 26. Such positioning of the pivot pin with respect to the spacer which forms the floor of the top and side channels insures that the rectangular spacer arranged immediately adjacent to the rectangular arm will limit rotation of the arm to a 90° arc. It will be apparent that the size of the arc may be varied by positioning pivot pin of the arm away from the spacer or changing the shape of the arm or the spacer. While the exemplary embodiment shown in FIGS. 1, 2, and 3 discloses an apparatus providing a 90° arc, other ranges of rotation are within the scope of this invention.

The mounting arm includes a threaded bore 30 to facilitate attaching a pan-and-tilt tripod head 38 and a camera 32 to the mounting arm in such a position with respect to the pin so that the weight of the camera and tripod head attached thereto urges the mounting arm to rotate into contact with the spacer at both vertical and horizontal positions of the mounting arm. Although the preferred embodiment shown in FIGS. 2 and 3 disclose the camera attached to the mounting arm by a pan-and-tilt tripod head, thereby affording a wide range of aiming adjustments, it is within the scope of this invention to attach the camera directly to the mounting arm of the present invention. Indeed, a variety of devices may be used to attach the camera to the mounting arm provided that the camera is mounted in such a position so as to urge the mounting arm against the spacer at both extremities of the mounting arm's permitted rotation.

As can be seen in FIG. 3, the mounting arm is of the same approximate thickness as the spacer, allowing the arm to freely rotate between the plate members within its prescribed arc, yet preventing movement of the arm perpendicular to its plane of rotation. When the arm is in the horizontal position shown in FIGS. 1, 2 and 3, the arm, and consequently the camera mounted thereon, is stabilized by being seated in the closely fitting top channel 24. Similarly, when the arm is in the vertical position shown in FIGS. 1 and 2 in dashed lines, the arm is stabilized by being seated in the closely fitting side channel 26. Constructing the invention so that the arm may rotate freely between the plate members yet be snugly received in the top and side channels may be achieved by careful sizing of the arm, shimming the spacer, or other suitable methods.

The support frame assembly 10 is adapted to mount on the edge of a vertically oriented, generally planar supporting structure such as an automobile window 40 by receiving a portion of the window in the bottom channel 28. A pair of threaded clamping screws 42 pass through and are engaged by corresponding threaded passages 44 in the lower portion of the front plate member 12. Clockwise rotation of the clamping screws causes them to move toward the rear plate member 14, clamping the window securely between the clamping screws and the rear plate member. Similarly, counterclockwise rotation of the clamping screws causes the clamping screws to move away from the rear plate member, releasing the window. The threaded screws have non-rotating friction washers 46 on their tips to prevent rotation of the tips of the clamping screw against the window when the clamping screws are being engaged and disengaged. Both the friction washers and the rear plate member are coated with rubber or other suitable cushioning material 48 to enhance the grip of the support frame on the window and preventing marring of the window. The front plate member also includes a spirit level 50 or other suitable device to allow the support frame to be leveled or adjusted to meet composition requirements.

In operation, a camera 32 is attached to the mounting arm 20, preferably by a tripod head 38 as shown in FIGS. 2 and 3. The apparatus with the camera attached thereto is then placed on a window 40 of an automobile by positioning the top edge of the window in the bottom channel 28 of the camera mounting apparatus. The clamping screws 42 are then rotated to move the nonrotating friction washers 46 on the tips of the clamping screws into contact with the window and securely clamp the window between the clamping screws and the rear plate member 14. One or both of the clamping screws may be adjusted to ensure that the mounting arm, in its horizontal position, is level or in the desired position as indicated by the spirit level 50.

The support frame assembly 10 is immobilized by the clamping screws which hold it securely to the car window. The camers is securely attached to the mounting arm by the tripod head. The mounting arm is closely received by the top or side channels which prevent relative movement, except arcuate movement of the arm about the pivot pin, of the mounting arm with respect to the support frame providing a stable connection between the camera and the support frame.

If the photographer desires to switch from the horizontal format shown in FIG. 2 to the vertical format shown in dashed lines in FIG. 2 the mounting arm is merely rotated counterclockwise about the pivot pin until a portion of the mounting arm butts against the spacer 16 as shown in the cut-away portion of FIG. 2. The camera and mounting arm will stay in this position because the position of the camera with respect to the pivot pin puts a counterclockwise moment on the mounting arm forcing the mounting arm against the spacer. In this fashion the camera may be instantaneously and securely reoriented from a horizontal format to a vertical format. As previously described, the mounting arm and camera are stabilized by the closely fitting plate members forming the walls of the side channel. To return the camera to the horizontal orientation the photographer merely rotates the mounting arm and camera clockwise about the pivot pin until the mounting arm is fully seated in the top channel and is prevented from further rotation by the spacer. Similarly, the position of the camera with respect to the pivot pin imparts a clockwise moment to the mounting arm forcing the mounting arm against the spacer.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for angularly reorienting the photographic frame of a camera with respect to its photographic subject comprising:
   (a) a support frame;
   (b) a mounting arm;
   (c) pivot means cooperating between said support frame and said mounting arm for permitting said mounting arm to freely rotate with respect to said support frame;
   (d) said support frame including first and second stop means for cooperating with said mounting arm to limit rotation of said mounting arm between first and second limits, respectively, of a preselected arc; and
   (e) said mounting arm including mounting means for attaching said camera to said mounting arm in such a position with respect to said pivot means so that gravitational force urges said mounting arm against said first stop means at said first limit of said preselected arc and against said second stop means at said second limit of said preselected arc, said mounting arm cooperating with said first and second stops as means for angularly reorienting said photographic frame of said camera with respect to said photographic subject.

2. The apparatus of claim 1, wherein said support frame includes stabilizing means for preventing movement of said mounting arm with respect to said support frame except for rotation of said mounting arm about said pivot means.

3. The apparatus of claim 1 wherein said support frame comprises first and second plate members arranged in parallel-spaced relation to each other.

4. The apparatus of claim 3 wherein a portion of said mounting arm is rotatably interposed between said first and second plate members.

5. The apparatus of claim 3, further including spacing means for maintaining said first and second plate members in parallel-spaced relation.

6. The apparatus of claim 5 wherein said spacing means are interposed between said first and second plate members, said spacing means and said first and second plate members together defining first and second channel means for closely receiving a portion of said mounting arm between said first and second plate members when said mounting arm is respectively at each extremity of the preselected arc.

7. The apparatus of claim 6 wherein said spacing means and said first and second plate members together define third channel means for receiving a portion of a supporting structure between said first and second plate members.

8. The appartus of claim 6 wherein said spacing means includes said stop means.

9. The apparatus of claim 3 wherein a portion of a supporting structure is received between said first and second plate members.

10. The apparatus of claim 1 including clamping means for releasably clamping said support frame to a supporting structure.

11. The apparatus of claim 10 wherein said clamping means includes means adapted to clamp said support frame to the edge of a generally planar supporting structure.

12. The apparatus of claim 10 wherein said clamping means includes third channel means for receiving the edge of said generally planar supporting structure.

13. The apparatus of claim 10 wherein said clamping means includes cushioning means to prevent scarring or marking of said supporting structure.

14. The apparatus of claim 1 including leveling means for determining whether said support frame is level.

* * * * *